INVENTOR
ALBERT W. VINAL
BY George J. Hotter
ATTORNEY

United States Patent Office 3,348,218
Patented Oct. 17, 1967

3,348,218

REDUNDANT MEMORY ORGANIZATION

Albert W. Vinal, Owego, N.Y., assignor to International Business Machines Corporation, New York, N.Y., a corporation of New York Filed July 3, 1963, Ser. No. 292,596
2 Claims. (Cl. 340—174)

ABSTRACT OF THE DISCLOSURE

A redundant magnetic memory organization having redundant classes of elements, to wit: magnetic core elements, driver, sensing and inhibit circuitry. The memory organization has four redundant memory arrays which are interlinked by the driver, sensing and inhibit windings such that a correct output is provided as long as one magnetic core of a redundant set together with its associated driver, sensing and inhibit circuitry has not failed.

The present invention relates generally to electronic digital data processing systems, and, more particularly, to a memory system which utilizes redundancy techniques to enhance reliability.

Considerable effort has been expended in the electronic data processing field toward the use of more than one circuit element to perform a particular function in a system in order to obviate system errors that occur when one or more componental elements are inoperative. Stated another way, each element of a system is duplicated in a manner such that failure of the element will not adversely affect the total operation of the system. This technique is known as redundancy and includes many alternative techniques such as majority voting and adaptive self-repairing circuits. An article which discusses these various techniques and describes the general state of the art existing at the time of the present invention is that entitled, "Redundancy Schemes Promises Higher Reliability," pages 4 and 5 of Electronic Design, Feb. 15, 1961. In this article the use of placing electronic components or subcircuits in quad-redundant circuitry is discussed in detail, which technique is of fundamental and critical importance here. Briefly, according to this technique it is contemplated to take a transistor circuit, say, and duplicate it four times in a given environment thereby substantially increasing the reliability of the system it comprises.

When it is decided to use a redundant technique to improve the reliability of a given system, a further decision must be made as to the level at which redundancy takes place. Moreover, in a memory system including plural memory elements (addressing, sensing and inhibit instrumentation) the decision as to at which elemental level redundancy should take place is a difficult one. At one extreme two, three or four completely independent memory units can be instrumented with and operated in a manner such that a malfunction in one of the memories can be detected and the remaining memories provide the correct input to the computer system. while such a technique is not impossible it would in general be impractical from an equipment point of view because of the large amount of components required. Moreover, the system reliability obtained through the use of redundancy at this level would not be the best due to the relatively high unreliability factor attributable to the high component count of any one memory in which a single component failure will cause a memory failure.

On the other hand, if every component of a memory system (magnetic core, transistor, diode and resistor) were in itself placed in a redundant circuit, the component count for the memory system would be completely out of reason from a cost standpoint. Moreover, it is not certain that a memory system can be designed in which each element (core, transistor, diode, resistor) is in itself placed in a redundant circuit.

Accordingly, with but the mere theoretical techniques described above available to the designer for using redundancy to increase reliability in a memory system, it was not definitively known prior to the present invention how to use redundancy in memory systems in a practical and efficient manner. One of the features of the quad-redundancy schemes described in the above referenced article was that functional units arranged in quad circuit configuration are subject to two general types of failures. One is the shortcircuit failure in which the input is connected directly to the output, and the other is the open circuit failure in which the input is electrically isolated from the output. It is a fact that most components can exhibit these two types of failure modes which gives rise to substantial complications when it is desired to arrange them in redundant relation. As known to those skilled in the art, when a magnetic memory element of either the single or multipath type is utilized in a memory-system, its associted instrumentation comprises energizing windings for writing into or reading out from the element, inhibit windings for inhibiting a writing operation in accordance with the digital information being stored, and sensing winding apparatus to sense a change in a magnetic condition indicative of the information stored therein. Should a failure be present in any of the magnetic elements it has the quality of being susceptible to an operation in which no signal is generated as a sensible output and as a result by properly utilizing a magnetic memory element in certain circuit environments it is possible to assure an open circuit type of failure in which no sensible output is generated. Accordingly, the unit level at which redundancy is to be utilized can be changed and the aforementioned redundancy circuit is not determinative of the number of redundant components required. Of course, certain of the memory components are more reliable than others. For example, the reliability of the magnetic core itself is much higher than that of the transistors, diodes, resistors, and the like required to instrument the magnetic core in its circuit environment.

It is, therefore, a primary object of the present invention to provide a new and improved memory system wherein redundant memory techniques are utilized.

It is another object of the present invention to provide a new and improved magnetic memory system in which a component failure results in no sensible output during reading or interrogation operations.

It is another object of the present invention to provide a memory system utilizing redundant single path magnetic core devices.

It is an additional object of the present invention to provide a memory system using redundant transfluxor multipath memory elements.

It is still another object of the present invention to provide a magnetic memory system wherein redundant memory elements are arranged to tolerate coordinate addressing current failures in a coincident current coordinate selection arrangement.

It is still another object of the present invention to provide a memory system using redundant magnetic memory elements to provide an optimal component memory system with reliability benefits accruing from redundance.

The above objects may be accomplished by constructing a quad-redundant memory system comprised of magnetic elements wherein a failure of any of the functional units (memory element, addressing energization, inhibit energization and sensing instrumentation) results in a single type of failure characterized by an open circuit.

The foregoing and other objects, features and advantages of the invention will be apparent from the following more particular description of preferred embodiments of the invention as illustrated in the accompanying drawings.

In the drawings:

FIGURE 9(*b*) illustrates certain current waveforms helpful in understanding the operation of FIGURE 9(*a*).

Figure 1:
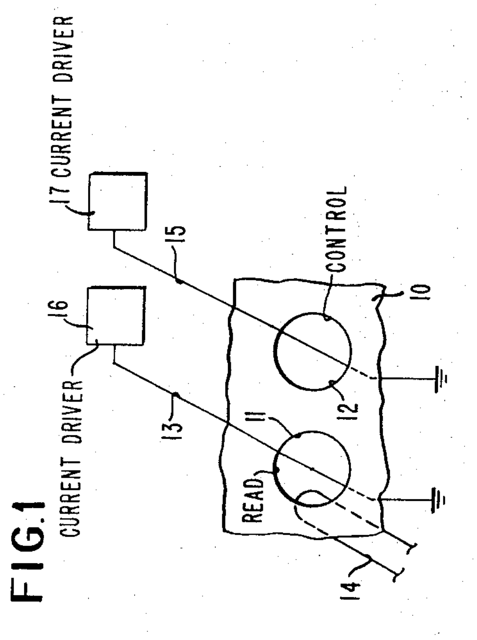
FIGURE 1 shows a transfluxor type memory element which can be used in practicing the teachings of the present invention.

With respect now particularly to FIGURE 1 of the drawings, there is shown an unbounded piece 10 of magnetic material having a square loop characteristic. A pair of apertures 11 and 12 extend completely through the piece 10 and for present purposes can be considered as having the same relative dimensions. The aperture 11 is referred to here as a read aperture (READ) and is provided with a read winding 13 passing therethrough. Also passing through the read aperture is a sense winding 14. The aperture 12 is termed a control aperture (CONTROL) and includes a winding 15 inductively coupled therewith.

Current driver 16 is operatively related to the read winding 13 for selectively providing driving current pulses of either polarity. Similarly, a bi-polar current driver 17 is connected to the control winding 15 for passing pulses of either polarity along the winding in a selective manner. These current drivers are of conventional construction, satisfactory examples of which are to be found in U.S. Patent 2,988,732 that is assigned to the same assignee entitled "Binary Memory System," filed Oct. 30, 1958, Albert W. Vinal, inventor.

Figure 2:
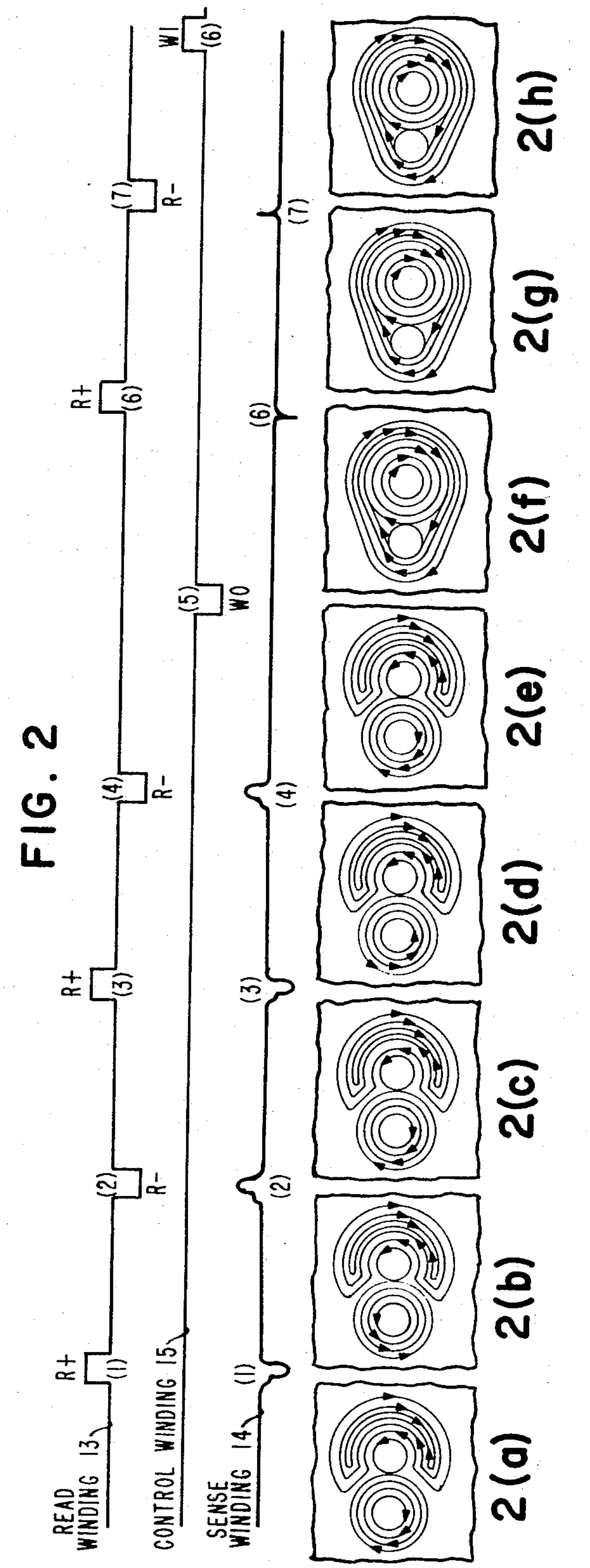
FIGURE 2 shows electronic waveforms and flux patterns useful in understanding the memory element of FIGURE 1.

The waveforms and diagrammatic representations of associated induced magnetic field conditions in the material 10 of FIGURE 2 should be referred to now in connection with the following description of the theory of operation. Assume initially that the read winding 13 is provided with a positive current pulse from the driver 16 shown as $R+(1)$, this produces a field condition about the read aperture that is in a clockwise direction as shown in FIGURE 2(*a*). Because this flux condition around the read aperture 11 has been a change from a zero flux condition to a certain value there is an inductive effect on the sense winding 14 producing the associated opposite polarity voltage shown.

Similarly when a negative current pulse $R-(2)$ is passed along the winding 13 there is a reversal of direction of the flux about the read aperture to a counterclockwise direction shown in diagram 2(*b*) which in turn induces the positively going pulse (2) in the sense winding 14. Similarly with a subsequent positive pulse (3) and a negative pulse (4) there are once again produced corresponding sense winding voltage pulses (3) and (4) of the respective polarities shown.

It is clear therefore that current pulsing of the read winding 13 produces a corresponding voltage signal in the sense winding 14 by changing the flux of the magnetic core material comprising the body 10 in areas immediately adjacent the aperture 11. As evidenced by the associated diagrams 2(*a*)–2(*d*) of the remanent flux condition about the control aperture 12 the transformer action in the read aperture is unaffected by this flux. This state or condition for a given pair of apertures is defined at this time as a first binary condition.

Assuming an initial condition for the read aperture and remanent flux about the control aperture to be as in diagram 2(*e*), a description will be given of the manner of impulsing the control aperture to prevent or inhibit transformer action between the read winding 13 and the sense winding 14. Impulsing the control winding 15 with a negative current pulse (5) WO from the driver 17 generates a clockwise flux around the control aperture 12 which, because of the flux about the read aperture being in an aiding or assisting relationship, the total flux will be directed in a clockwise direction about both of the apertures as shown in FIGURE 2(*f*). More particularly, the flux is directed in a closed path including both the read and control apertures with the flux components in the magnetic material between the apertures cancelling one another, that is, the components provided by the read winding and those provided by the control winding being substantially equal and oppositely directed. This general configuration of flux is usually referred to as a "pulley pattern." It is important to note that the magnitude of the pulse (5) for accomplishing the above described result need only be that amount necessary to produce saturation in the material between the apertures.

Application of either a positive going pulse $R+(6)$ or a negative going pulse $R-(7)$ to the read winding 13 at this time is incapable of reversing the flux pattern or significantly changing it in order to permit a full transforming action, and instead only the small voltage pips corresponding to (6) and (7) are produced in the sense winding 14 with no change in the overall flux pattern.

The control winding 15 with a positive pulse (6), W1 reverses the direction of the flux lines immediately adjacent the aperture 12 so that they are directed in a counterclockwise direction. Since the flux patterns described about each of the apertures are now in opposing relation the flux in the region of the control aperture 12 is now turned back about itself as in FIGURE 2(*a*) forming what is sometimes termed a kidney. As brought out above, transforming may take place between the windings 13 and 14.

Figure 3:
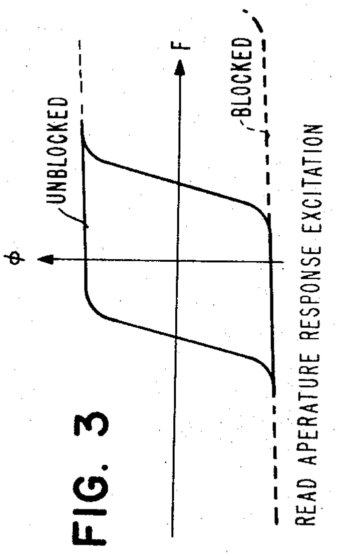
FIGURE 3 shows a response excitation characteristic which is helpful in understanding the operation of the memory element of FIGURE 1.

FIGURE 3 illustrates two graphs of the hysteresis curve of a magnetic device operated in the manner illustrated in FIGURES 1 and 2, and, more specifically, these graphs pertain to the magnetic flux in the areas closely adjacent the read aperture 11 during the above-described two different stable magnetic states representative of two binary conditions. The solid-line graph is that obtained in the so-called "unblocked" condition as in the FIGURES 2(*a*)–2(*e*) where successive interrogation pulses of different polarity on the line 13 induces corresponding voltage signals in the sense winding 14. The dotted-line graph, on the other hand, represents the "blocked" condition illustrated in FIGURES 2(*f*)–2(*h*) where transformer action between interrogation line and sense winding 14 is reduced to an extremely small value.

The unblocked and blocked conditions described in the immediately preceding paragraphs represents, respectively, two different binary conditions which can selectively be set up within any magnetic memory device constructed with paired apertures and associated actuation circuitry, and it is seen that these conditions are distinguished from one another by the fact of whether or not significant transformer action takes place between the read winding 13 and the sense winding 14. Further, it is important to note that the interrogation by pulses fed to the read winding 13 can be performed any number of times without changing the binary state, which characteristic causes memories constructed of these devices to be referred to as nondestructive read out (NDRO).

Figure 4:
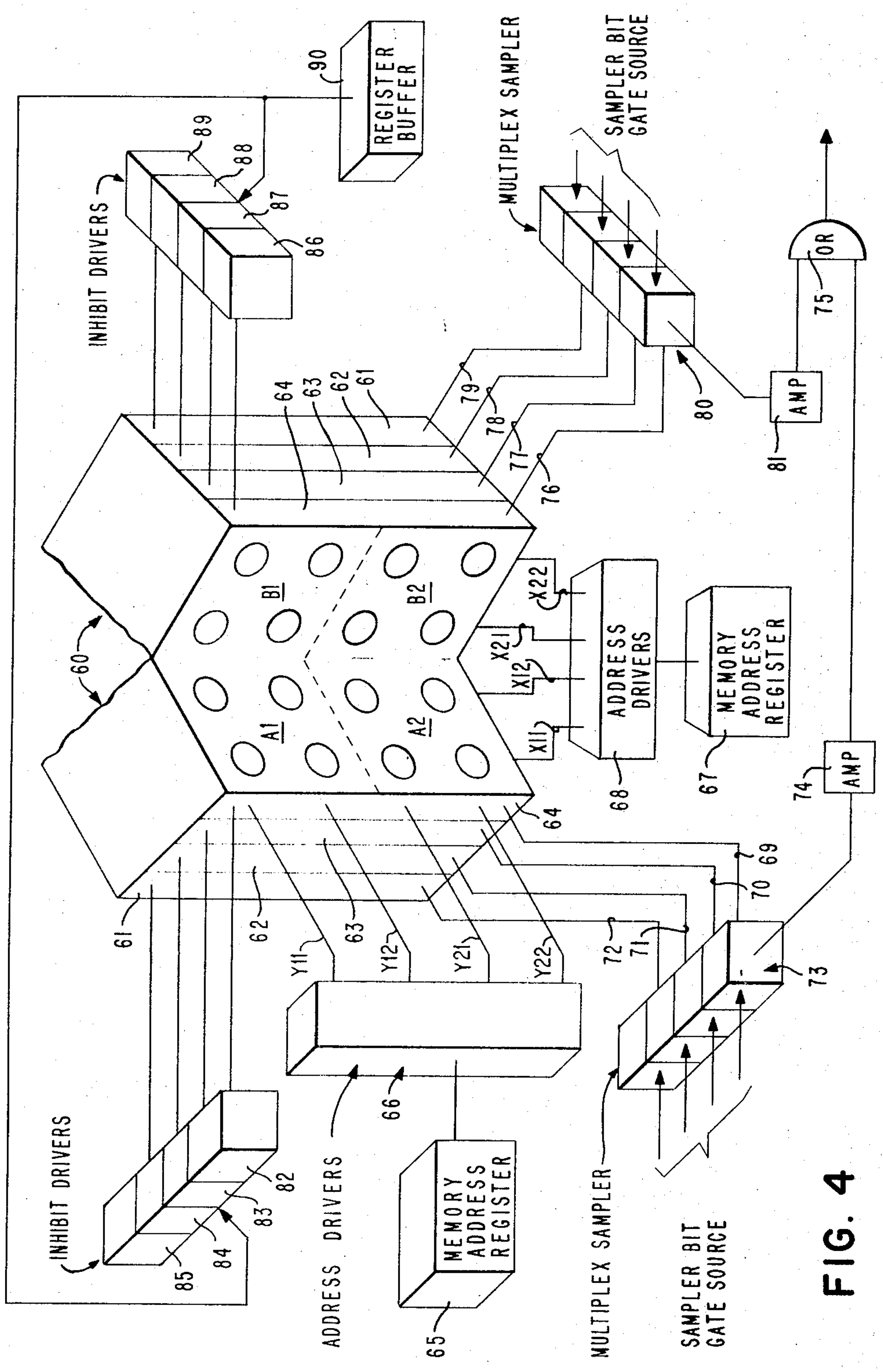
FIGURE 4 shows the memory element of FIGURE 1 arranged in a coincident current address selection memory system using four redundant memory elements according to the teachings of the present invention.
Figure 5:
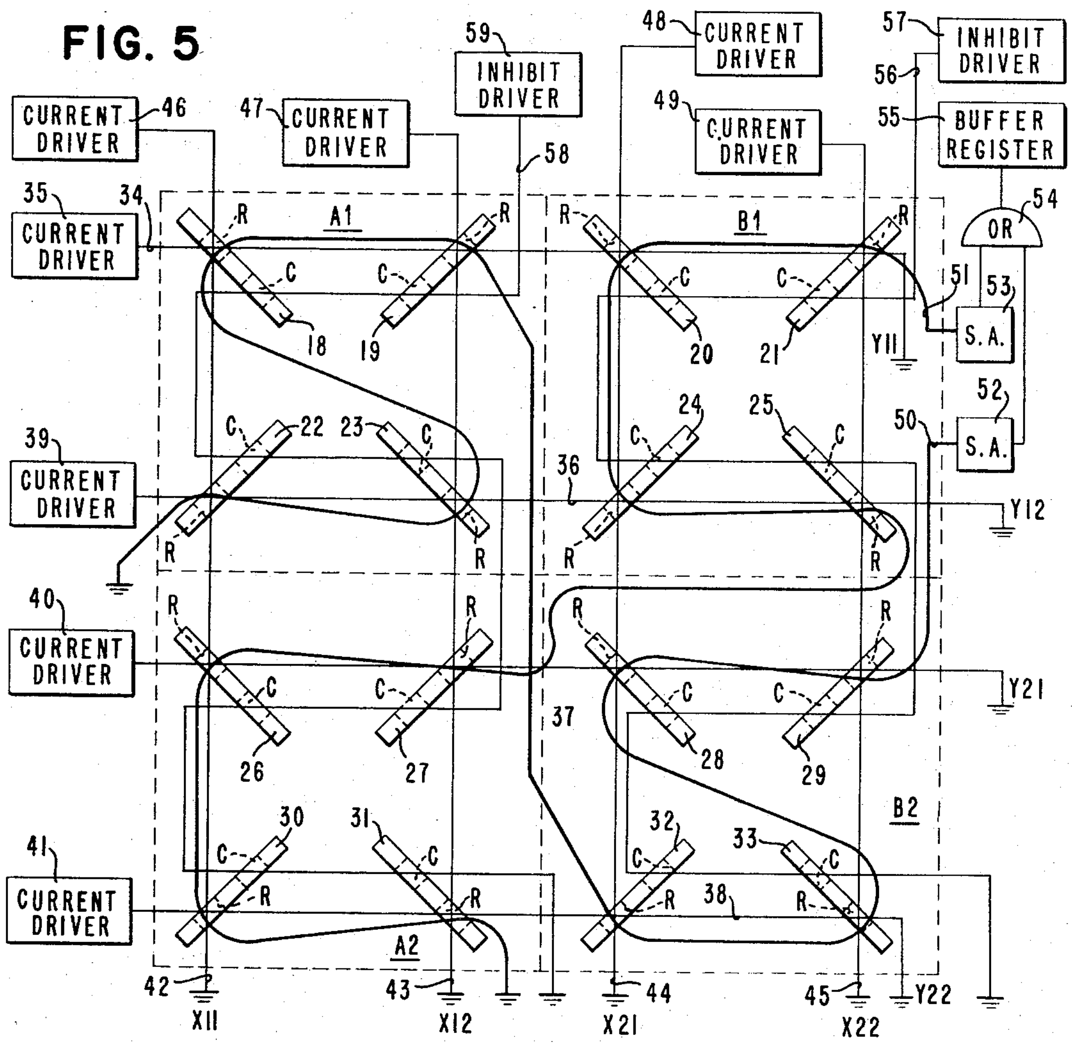
FIGURE 5 shows the arrangement of the address, inhibit and sensing conductors of a single memory plane in the system of FIGURE 4.

Turning now to FIGURES 5, there is illustrated a single plane of magnetic memory elements each of the double aperture type described above. This plane is one of a plurality that comprises a memory system made in accordance with the practice of the invention shown in FIGURE 4. Although it is clear that such memory planes can consist of any practical number of memory elements, for purposes of illustration the plane is shown consisting of sixteen (16) elements numbered 18–33 and arranged into four sets A1, A2, B1 and B2 of four elements each. In actuality, each set of memory elements is electrically a separate array of memory elements, and it is the contemplation here that each set will contain identical stored information in its respective identically coordinated elements. Thus, using coordinate terminology the elements of A1 can be termed X11–Y11, X11–Y12, X12–Y11 and X12–Y12, with corresponding coordinated elements in A2, B1 and B2.

A Y-coordinate drive winding 34, indicated in coordinate terms as Y11, is passed through the read apertures (R) of memory elements 18–21. A current driver 35 which can be of construction identical to the previously described driver 16, is connected to one end of the winding 34, the other end of which is ground referenced.

Similarly, windings 36–38 are threaded, respectively and individually, through the sets of elements 22–25, 26–29 and 30–33. These windings can also be referred to by the coordinate designations Y12, Y21 and Y22, respectively. Associated current drivers 39–41 provide energization and interrogation current pulses for a use that will be made clear later.

A set of X drive windings 42–45, coordinately identified as X11, X12, X21 and X22, are supplied for individually passing through the read apertures of elements 18, 22, 26 and 30+; 19, 23, 27 and 31+; 20, 24, 28 and 32; and 21, 25, 29 and 33. Associated X current drivers 46–49 separately feed the X drive windings the other ends of which are set to ground. As with the Y current drivers, the X drivers can be satisfactorily provided by the drivers disclosed in the above-cited patent.

It is important to note at this time a fundamental distinction in operation over that described above for the single element in FIGURE 1. Thus, as previously described, a single pulse on the line 13 was used to induce a voltage signal in the winding 14. However, in the plane of FIGURE 5 it is necessary that both an X and a corresponding Y drive pulse be obtained at the same time, or in coincidence, for a sense winding indication. This feature is set forth and discussed in detail in the patent referred to above.

A single sense winding 50 passes through the read apertures of each memory element in groups A1 and B2. Further, a second sense winding 51 is inductively related to each element of groups A2 and B1 through their associated read apertures. One end of the sense windings is grounded and the other end of each of the windings is fed via sense amplifiers 52 and 53 into an OR-gate 54 for presenting a signal to a buffer register 55.

The control apertures of the elements of groups A1 and A2 are linked by a control, or inhibit, winding 58. One termination of this inhibit windings is grounded and the other is electrically related to an inhibit driver 59. In a like manner, the elements comprising the groups B1 and B2 are commonly related by a single inhibit winding 56 which is fed by an inhibit driver 57. Both drivers 57 and 59 are satisfactorily provided by the device referenced for the driver 17.

Figure 6:
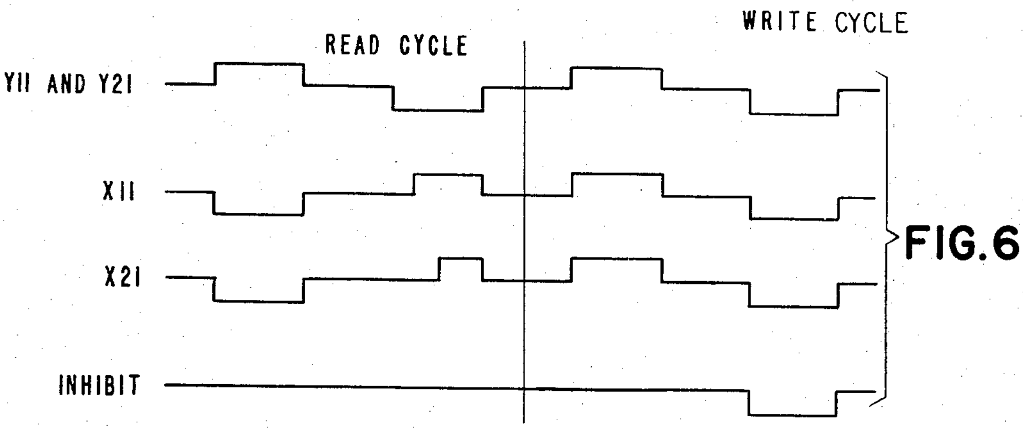
FIGURE 6 is a current timing graph of the memory plane of FIGURE 5.

To describe the operation, assume each group of elements and all drivers are in good working order. Also, assume that a binary "one" condition exists in elements 18, 20, 26 and 28, that is, they reside in an unblocked condition as illustrated in FIGURES 2(*a*)–2(*d*). As the graph of FIGURE 6 shows the first part of the read cycle consists of the application of positive current pulse on each of the driver lines Y11, Y21, and negative current pulses on each of the driver lines X11, X21 in time coincidence. Since the memory elements at the coordinate locations defined by these driver lines are all in the unblocked condition, there is a consequent induction of voltage signals in the sense windings which are amplified by the sense amplifiers and OR-gated to the buffer register 55. The second part of the read cycle consists of a negative pulse applied to Y11 and Y21, a positive pulse on X11 which begins slightly later than the pulse on Y11 and Y21, and a positive pulse on X21 which starts somewhat later than that on X11. This arrangement of drive pulses causes signals to be generated in groups A1 and A2 before like generations in B1 and B2. It is clear from the foregoing that if there is a failure of all but one of the similarly coordinated elements there is still a signal provided to the buffer register correctly indicating a binary "one" condition.

If a "zero" exists at the locations interrogated in the above manner, that is the elements are in a blocked condition, no signals are induced in the sense windings because of the inability of respective cores to switch. Or restating, the "zero" condition is evidenced by a no-signal state on the sense windings when interrogated.

To store a "one" at the same locations, that is set the corresponding memory elements to the unblocked condition, during the first part of the write cycle a positive pulse is applied to the Y11 and Y21 windings while simultaneously passing a positive pulse through the X11 and X21 windings. From the discussion given hereinabove it is clear that these positive pulses kidney the flux about the control apertures of the different memory elements and they are accordingly set to the binary "one" condition.

During the second half of the write cycle, to place these same elements in a blocked condition or binary "zero," a negative pulse is passed through the Y11 and Y21 windings while at the same time a negative pulse of corresponding value is provided to the X11 and X21 windings. These negative pulses control the flux distribution of the elements such that a pulley pattern remanence is established indicative of a binary "zero." However, if it is desired to maintain these elements in the one state, then a negative inhibit pulse is coincidentally applied with the negative pulses as is obvious to those skilled in the art.

A complete memory system made in accordance with the teachings of the invention and relying on a two-apertured magnetic device for its fundamental storage unit is set forth in FIGURE 4. The primary memory storage unit 60 consists of four (4) physically distinct memory planes 61–64 of construction identical to that of FIGURE 5, which planes are shown stacked to form a three-dimensional configuration.

A Y memory address register 65 is provided for selectively actuating the address drivers 66 for the Y windings Y11, Y12, Y21 and Y22. In a similar manner, an X memory address register 67 selects the appropriate address drivers, shown collectively at 68, to supply current to the windings X11, X12, X21 and X22. Each of the X and Y drive windings is common to all similarly coordinated memory elements in the different planes.

A first set of sense windings 69–72 relates the elements of groups A1 and B2 of each plane, respectively, to a multiplex sampler 73. The sampler is conditioned for selective read-out from the individual planes by energizing signals from a sampler bit gate source (not shown). The gated sense signals are amplified by amplifier 74 for presentation to OR-gate 75.

In like manner, a second set of sense windings 76–79 commonly link the read apertures of the memory elements comprising groups A2 and B1. The sense windings are controlled by a multiplex sampler 80 which can be individually presented to an amplifier 81 by selective energization from the sampler bit gate source (not shown). As before the amplified sense signals are then OR-gated by the gate 75.

A full equivalent for the multiplex samples 73 and 80 are the transformer sampling switches TR120–TR123 described in copending patent application, Ser. No. 205,769, entitled "Electrical Switching Means," by A. W. Vinal, filed June 27, 1962 and now U.S. Patent 3,231,876, issued Jan. 25, 1966 and which is assigned to the same assignee.

Inhibit drivers 82–85 furnish appropriate energy pulses to the inhibit windings of A1 and B2 of each plane. The inhibit drivers 86–89 likewise control the elements of groups B1 and A2. The determination and control of the two sets of inhibit drivers reside in a register buffer 90 of conventional construction.

Access to information stored in the memory 60 is accomplished by setting the appropriate location coordinates into the address registers 65 and 67 and simultaneously furnishing actuation signals from the sampler bit gate source to obtain read-out from the correct plane. Depending upon whether a "one" or "zero" exists at the location being interrogated a sense will be generated or not.

For writing, the appropriate setting is made in the memory address registers 65 and 67 as well as inhibiting all planes but the correct one by suitable control of the register buffer. Also, during write cycles the sampler bit gate source is not providing actuation pulses and the multiplex sampler does not pass any sense signals that may be generated.

An important advantage obtained from the use of the double-apertured NDRO device in a redundant system is that failure of such a device is to the "zero" state. Thus, failure of as many as three of a set of redundant elements of the same coordinates can occur and a correct result will still be read out. In explanation, if the correct binary condition is a "one," the fact that three of the redundant memory elements produce no sense signal is not controlling since with but a single element indicating a "one" there is a correct result obtained.

It can be shown that considering an operation cycle of one year a memory system of the above described redundant type has a reliability which is more than three hundred times that of a system employing similar basic memory elements in a more conventional non-redundant design. Note is to be made of the fact that the considerable enhancement in reliability here is attributable to both the special redundancy configuration and the characteristic of the nondestructive memory element to fail to "zero." The latter feature is especially valuable in obviating the necessity for voting the sense output signals requireed in certain prior art redundant systems.

Figure 7:
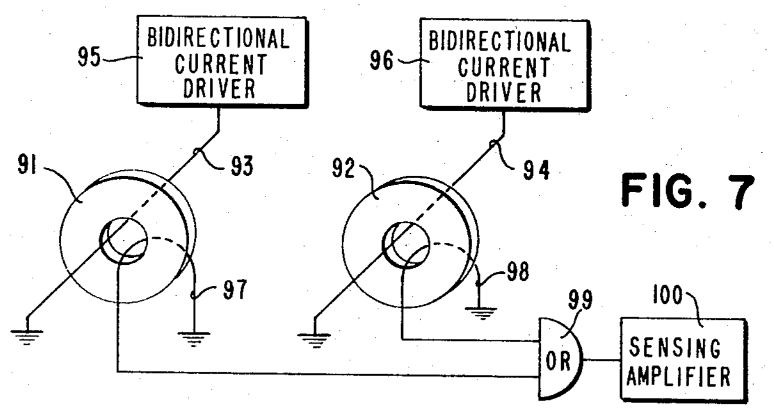
FIGURE 7 shows a toroidal core which can be used to practice the invention.

Another form of the invention set forth in this specification utilizes the more conventional single aperture, toroidal-shaped magnetic core such as the cores 91 and 92 shown in FIGURE 7. More particularly, these toroids are disclike bodies of magnetic material having a single circular aperture passing completely therethrough. The cores are each provided with separate drive lines 93 and 94, one end of which lines is grounded and the other electrically related to respective bidirectional current drivers 95 and 96. Sense windings 97 and 98 also are inductively linked to the apertures and have one termination grounded and one fed into an OR-gate 99. Assuming either an initial "zero" flux condition or random distribution of flux, application of a particular current pulse to a drive line establishes a certain orientation, or direction, to the magnetic condition of the core. Thereafter, application of a current pulse of the same polarity as the first pulse produces no change in the flux status of the core, which condition can be considered as a coded representation of, say, the binary "zero" condition. If a pulse of opposite polarity and sufficient magnitude is applied to the drive line a reversal of the flux orientation occurs, which change is reflected by the induction of an electric signal in the associated sense winding. The induced signal passes the OR-gate 99 for presentation to a sensing amplifier 100 for subsequent utilization. The presence of a sense signal offers a coded representation for the other binary state, that is the "one."

Figure 8:
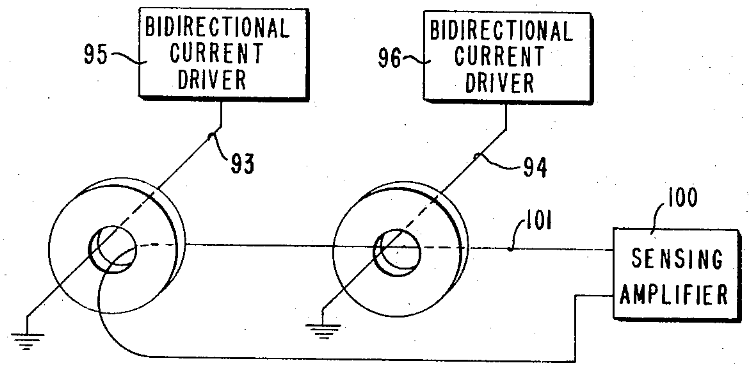
FIGURE 8 shows a modification of the teachings of the present invention shown in FIGURE 7 wherein a single conductor is substituted for an OR circuit shown in FIGURE 7.

FIGURE 8 shows a modification of the circuit of FIGURE 7, which consists essentially of threading a single sense winding 101 through both apertures and connecting the terminations directly to the sensing amplifier.

Figure 9A:
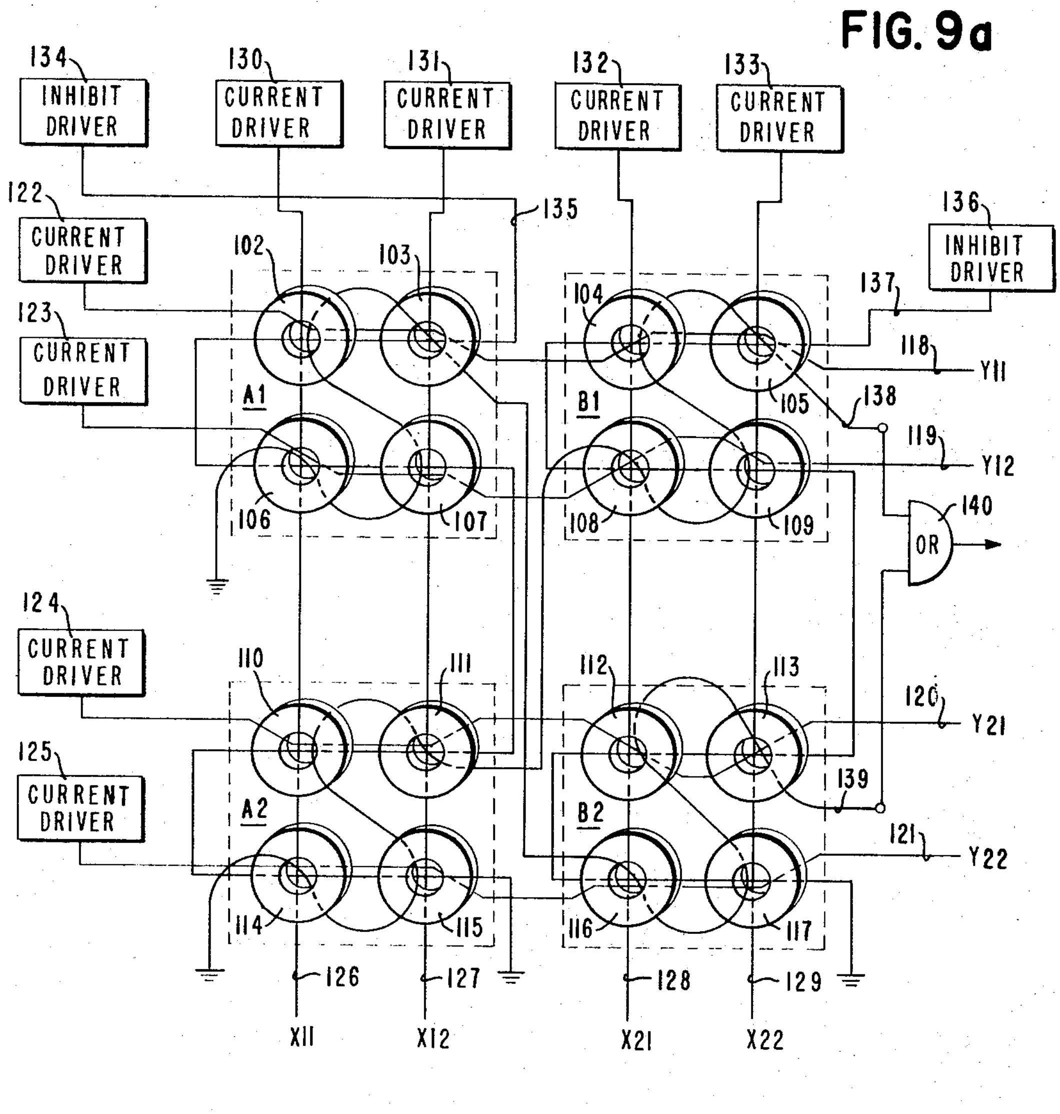
FIGURE 9(*a*) shows the teachings of the present invention as applied to toroidal core memory elements specifically arranged for coincident current address selection.
Figure 9B:
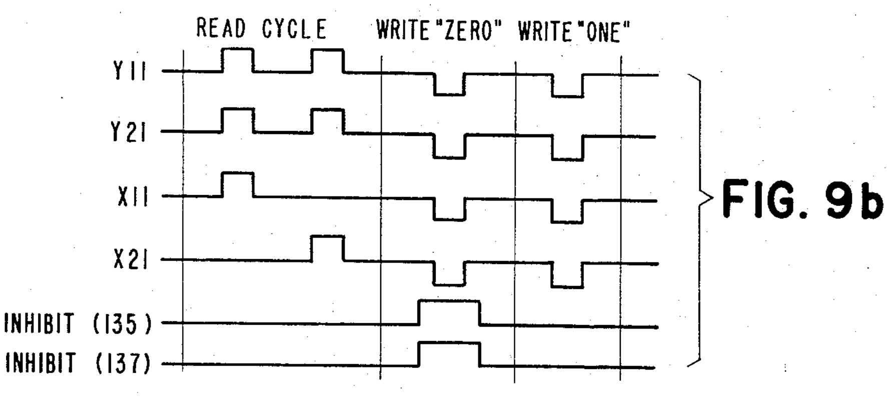

A single plane of toroids is shown with associated instrumentation arranged in accordance with the practice of the invention in FIGURE 9(*a*). Sixteen (16) cores 102–117 are arranged into a two-dimensional matrix form comprised of four groups A1, A2, B1 and B2 of four cores each. Drive line 118 links cores 102–105 and serves to define Y-coordinate Y11. Similarly, drive lines 119–121 respectively link the sets of cores 106–109, 110–113 and 114–117. Suitable Y current drivers 122–125 supply actuation pulses for the drive lines 118–121.

A set of X-coordinate defining drive lines 126–129 inductively link, respectively, cores 102, 106, 110 and 114; 103, 107, 111 and 115; 104, 108, 112 and 116; and 105, 109, 113 and 117. The associated current drivers for the X drive lines 126–129 are indicated by the respective reference numbers 130–133.

Inhibit driver 134 powers the inhibit winding 135 which passes through the apertures of each core included in groups A1 and A2. A second inhibit driver 136 drives the inhibit winding 137 that threads through each of the elements in B1 and B2.

A first sense winding 138 is magnetically linked with the cores of B1 and A2 whereas a second sense winding 139 passes through the apertures of the cores in A1 and B2. Both of the sense windings are presented to an OR-gate 140 for external utilization.

As in the case of the first described embodiment, the current supplied to the individual drive lines is insufficient to switch a core and it is necessary that the two drive lines associated with a given core both be provided with current at the same time to achieve switching. Or applied to the illustrated system, coincident application of current on drive lines Y11 and X11 will switch core 102 but leave the other cores through which they pass unaffected.

Reference to FIGURE 9(*b*) should be made for the following discussion of system operation. Assuming a "one" to be stored in cores 102, 104, 110 and 112, the first step in read-out is the simultaneous directing of positive read pulses onto lines Y11, Y21 and X11. In the manner already described, read-out is provided for cores 102 and 110, with a sense signal for each being generated in the corresponding sense windings to indicate the stored "one" condition.

The second phase of the read cycle is the supplying of positive read pulses to drive lines Y11, Y21 and X21. This serves to read out cores 104 and 112, inducing signals in the respective sense windings 138 and 139.

In the write cycle each of the appropriate drive lines is impulsed with a negative current pulse and the presence of an inhibit pulse of positive polarity causes a "zero" to be set up in the corresponding cores whereas the absence of an inhibit signal effects switching to the "one" state. The graph in FIGURE 9(*b*) shows the time relation of drive pulse information for storing either a "one" or a "zero" in cores 102, 104, 110 and 112.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A redundant magnetic storage system for storing binary information bits having at least one storage plane, said system comprising:

first, second, third and fourth redundant arrays of magnetic core elements in said plane, each of said arrays having corresponding similar row and column coordinate locations, said core elements being further arranged in redundant sets, each of said sets including a mutually exclusive core element from each of the four arrays, the core elements included in a respective set being located at the same coordinate locations in each of their respective arrays, and each of said core elements being settable to either of two magnetic states representing the binary information bits "1" and "0," respectively;

coincident-current selection means for redundantly setting the respective core elements in each of the particular sets to the same magnetic state of said either of two magnetic states, each particular set of core elements being set by said selection means to the predetermined one of said two magnetic states which represents the binary information bit to be stored in the particular set, said coincident-current means comprising a plurality of half-current select windings and mutually exclusive current drivers coupled thereto, each of the core elements of said first and second arrays located in the same column coordinate locations being commonly linked by a mutually exclusive one of said plurality of half-current select windings, each of the core elements of said third and fourth arrays located in the same column coordinate locations being commonly linked by a mutually exclusive one of said plurality of half-current select windings, each of the core elements of said first and third arrays located in the same row coordinate locations being commonly linked by a mutually exclusive one of said plurality of half-current select windings, and each of the core elements of said second and fourth arrays located in the same row coordinate locations being commonly linked by a mutually exclusive one of said half-current select windings;

first and second sense windings, each of said core elements of said first and fourth arrays being commonly linked by said first sense winding, and each of said core elements of said second and third arrays being commonly linked by said second sense winding; and output means for receiving the indication of said first and second sense windings to provide respective output signals indicative of the particular magnetic states of said sets, said output means having first and second sense amplifiers and OR circuit means, said first and second sense amplifiers having first and second input terminals coupled to said first and second sense windings, respectively, and further having first and second output terminals, said OR circuit means having a pair of third and fourth input terminals coupled to said first and second output terminals, respectively, and said OR circuit means having an output terminal at which said output signals are provided.

2. A redundant magnetic memory system according to claim 1 further comprising first and second inhibit windings, each of said first and second inhibit windings having a mutually exclusive current driver coupled thereto, each of the core elements of said first and second arrays being linked by said first inhibit winding, and each of the core elements of said third and fourth arrays being linked by said second inhibit winding.

References Cited

UNITED STATES PATENTS

| | | | |
|---|---|---|---|
| 2,911,631 | 11/1959 | Warren | 340—174 |
| 3,100,888 | 8/1963 | Oleksiak | 340—174 |
| 3,160,858 | 12/1964 | Adams | 340—174 |
| 3,193,807 | 8/1965 | Vinal | 340—174 |
| 3,278,915 | 10/1966 | Joseph | 340—174 |

BERNARD KONICK, *Primary Examiner.*

M. GITTES, *Assistant Examiner.*